Sept. 27, 1955      G. F. E. LOECK      2,718,816
PROJECTING AND ILLUMINATING SYSTEM FOR READING GRADUATIONS
Filed July 13, 1954
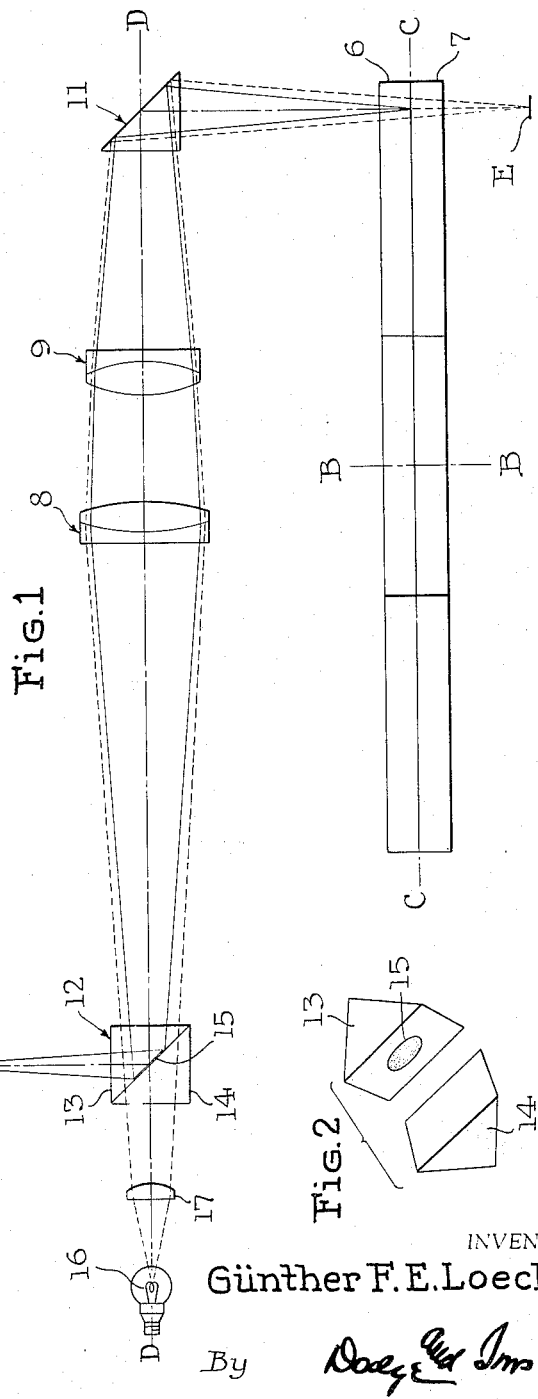
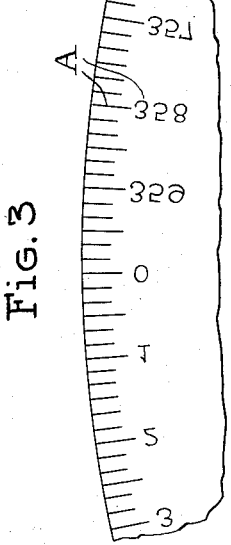
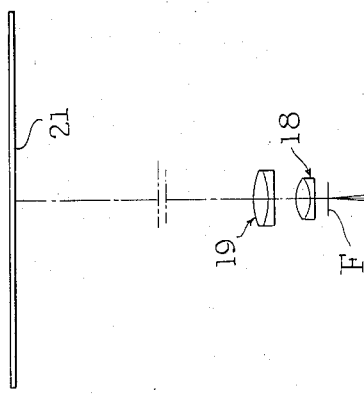
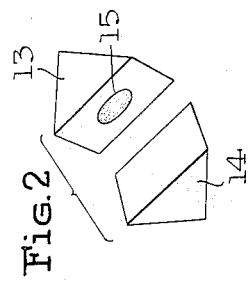
INVENTOR
Günther F. E. Loeck
By *[signature]*
ATTORNEYS

# United States Patent Office 2,718,816
Patented Sept. 27, 1955

2,718,816

PROJECTING AND ILLUMINATING SYSTEM FOR READING GRADUATIONS

Günther F. E. Loeck, Troy, N. Y., assignor to W. & L. E. Gurley, Troy, N. Y., a corporation of New York Application July 13, 1954, Serial No. 443,110

1 Claim. (Cl. 88—40)

This invention relates to a reading system for graduations, the system including a closely related illuminating means for the graduations to be read.

Many geometrical instruments have graduations so fine that they must be read by a magnifying optical system. Where an artificial light source must be used, as is often the case, the light source must be sufficiently remote from the graduated element to prevent transmission thereto of disturbing amounts of heat.

Space considerations are commonly severe, and make it virtually impossible to use two optical systems, one to project light and the other to project the image of the graduations.

The invention solves the problem by providing a single optical system, at least a major portion of which has a dual function, in that it transmits the illuminating light in one direction and the image light in the opposite direction. The effect is to assure the transmission of adequate light, and provide an adequate magnifying reading system in very little more space than would be required for either function singly.

The invention can be understood by reference to the accompanying drawing and the following description.

In the drawing:

Fig. 1 is an optical diagram of the complete illuminating and reading system.

Fig. 2 is a perspective view of two prism components, shown before assembly.

Fig. 3 is a fragmentary view of a graduated limb which can be read by the system of Fig. 1.

In the example illustrated the graduations A, shown in Fig. 3 are formed on the lower face of an annular disc 6 of glass which is mounted to turn on the geometric axis B—B normal to the plane of the disc.

As a practical matter on a six inch disc 6 the graduations commonly are too small to be seen with the naked eye, and occupy a narrow annular band of silver deposited on the lower face of disc 6. They are ruled through the silver deposit, and are protected by the annular cover glass 7. Thus the plane of the graduations is C—C. This is just one known type of graduation which can be read according to the invention.

The two optical systems have in common, in the axis D—D the two positive lenses 8 and 9, each shown as a doublet, the total reflecting prism 11, and the cubical element 12 made up of two 45° prisms 13 and 14 cemented together on the hypotenuse plane. On this plane on prism 13 is a central area 15, preferably elliptical, coated with silver or aluminum to render it opaque to light and fully reflecting at least as to light arriving from the right (considering the system as it appears in Fig. 1).

The illuminating light source 16 is on the axis D—D, as is a condensing lens 17.

The system 17, 12, 8, 9, 11 project an image of the light source 16 on the plane E. This is beyond the plane C—C, and the light rays which transmit this image pass through the cube 12 in areas around the silvered area 15.

In this way the graduated area of annulus 6, at the index point can be brightly illuminated from a remote source. An image of the graduations at said index point is projected along an entirely distinct path via prism 11, lenses 9 and 8 and reflecting area 15 to the plane F, where it may be read by any suitable magnifying system, according to well known principles. The path just mentioned is surrounded by the path from the light source but with minor exceptions has nothing in common therewith. The effect is to assure the formation at F of the best attainable image, and still conserve space.

In order to illustrate one acceptable system, Fig. 1 shows two lenses 18 and 19 arranged to project an enlarged image on screen 21.

The success of the described arrangement stems from the use of combined reflecting and transmitting element 12, to make it possible to arrange on a common axis parts of two systems which have lens elements, and at least one reflecting element in common. The effect is to afford adequate remote illumination and adequate magnification in the minimum space.

What is claimed is:

The combination of an object to be observed; a light source; a lens system having an optical axis and arranged to project light from said source upon said object and return light from the object to form an image of the object; a light transmitting member comprising right triangular prisms whose hypotenuse faces are cemented together, said member being interposed in said optical system on said axis; means affording on the plane of said hypotenuse surfaces an area which is opaque, and on the object-side also reflecting, said area being dimensioned to intercept the image-forming pencil of rays, substantially without intercepting illuminating rays, whereby the image-forming pencil of rays is alone laterally reflected; and magnifying means for viewing said image.

References Cited in the file of this patent

UNITED STATES PATENTS

| Number | Name | Date |
|---|---|---|
| 600,292 | Pierpont | Mar. 8, 1898 |
| 1,012,715 | Saegmuller | Dec. 26, 1911 |
| 1,281,035 | Levy | Oct. 8, 1918 |
| 1,637,348 | Ott | Aug. 2, 1927 |
| 1,784,425 | George | Dec. 9, 1930 |
| 1,840,448 | Heine | Jan. 12, 1932 |
| 2,038,914 | Templeton | Apr. 28, 1936 |
| 2,360,822 | Altman | Oct. 24, 1944 |
| 2,392,461 | Clifton et al. | Jan. 8, 1946 |